March 13, 1951   A. HARSHAM ET AL   2,544,681
TENDERIZATION OF MEAT
Filed March 18, 1947   3 Sheets-Sheet 1

Albert Harsham
Fred E. Deathrage   Inventors

By Wood Arey Herron + Evans
Attorneys

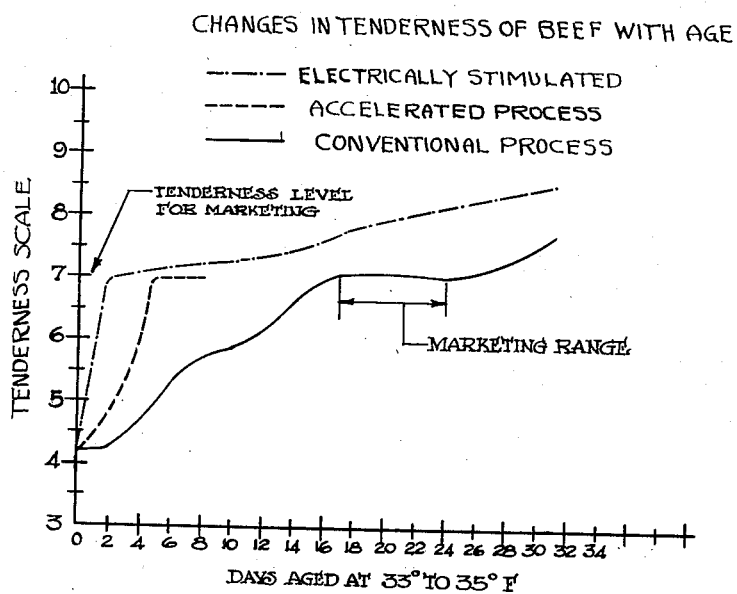
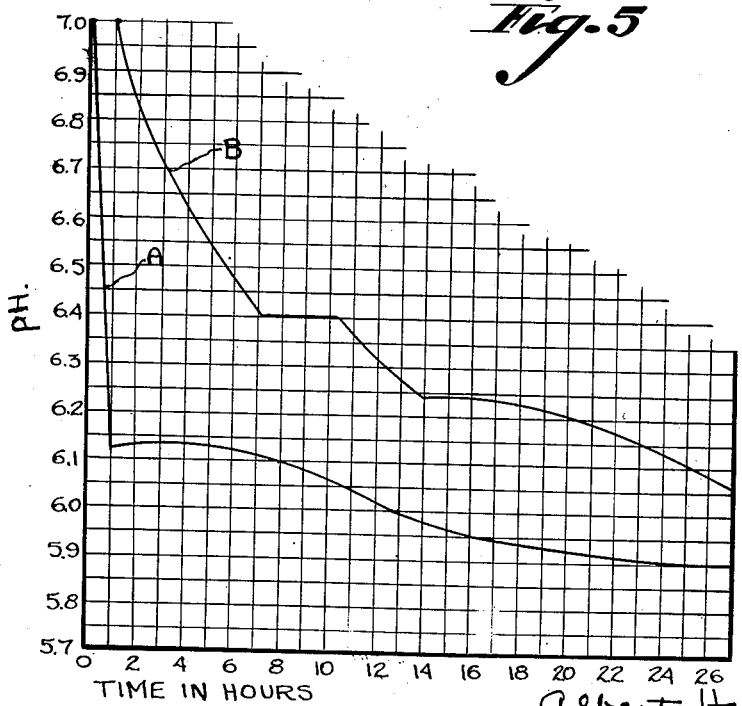

UNITED STATES PATENT OFFICE 2,544,681

TENDERIZATION OF MEAT

Albert Harsham, Cincinnati, and Fred E. Deatherage, Columbus, Ohio, assignors to The Kroger Company, Cincinnati, Ohio, a corporation of Ohio Application March 18, 1947, Serial No. 735,458

17 Claims. (Cl. 99—107)

This invention relates to a packing process for producing tender meat without subjecting the meat to a specific and separate period of time for ripening. The invention is directed particularly to an improved process for tenderizing meat in much less time than heretofore has been required, and at much less cost. As a result of these improvements, meat of abundant juiciness is produced having qualities of tenderness which heretofore have been characteristic only of meat ripened over prolonged periods of time.

This application is a continuation in part of Harsham and Deatherage United States patent application, Serial No. 611,690, entitled "Tenderization of Meat," which is now abandoned.

The invention is adapted to be used in the processing of flesh of various animals, but its benefits are most notable in the treatment of beef, since toughness in beefsteaks, roasts, and other cuts is more pronounced and therefore, much more undesirable than in other kinds of meat. For these reasons, the present invention is disclosed by way of illustration, but not by way of limitation, in relation to beef packing.

For many years it has been conventional practice in the beef packing industry to ripen or to age the flesh of slaughtered cattle by storing the meat for prolonged periods of time under refrigeration conditions at temperatures above freezing, but still sufficiently low to discourage decomposition or substantial bacterial or fungoid growth. During this period, softening of the tissues occurs which is attributable to enzymes in the meat, whereby the palatability and digestibility of the final product is improved. Usually the ripening operation will be continued from two to four weeks or longer, depending upon the quality desired in the final product, the facilities of the packing house for storing substantial quantities of meat under refrigeration conditions, and upon the prevailing market price or availability of meat.

Ordinarily, the temperature at which meat is aged by this method is substantially 35° F., that is, well below room temperature. It is apparent that extensive refrigeration and storage facilities are required not only to effect the initial reduction in temperature of large tonnages of animal flesh from the body temperature thereof to this lower 35° F. temperature, but to maintain quantities of meat at such lower temperatures for at least several weeks or more. Moreover, ripening, in this process proceeds so slowly that mustiness or off-flavors sometimes develop due to mold growth, and losses are involved in the trimming which is necessary to remove the affected portions. On the whole, the process is expensive, due to the cost of installing and maintaining the refrigeration and storage equipment, due to the cost of maintaining large inventories of the meat in process during aging, and due to the trimming losses which are an unavoidable concomitant of this treatment. Nevertheless, most beef is ripened in this manner at the present time. While the rate of fungoid and bacterial growth may be retarded by a reduction in storage temperature, still the lower temperature simultaneously retards favorable enzyme reactions which make the meat tender, and increases the other costs which are involved.

More recently, a process has been introduced into the industry enabling the ripening period of beef to be shortened, without loss of quality, from the two to four weeks period which formerly prevailed, to a period of approximately three to five days. According to this more recent technique, which is fully described and claimed in James United States Patent No. 2,169,081, of August 8, 1939, the meat, after an initial chill to 36–40° F., is maintained at a temperature of 55–68° F., whereby essential softening of the tissue is obtained through a more pronounced action of the autolytic enzymes in the flesh. However, under such storage conditions, moisture, constituting a substantial portion of the animal carcass, is dissipated therefrom by surface evaporation, the extent of dehydration being related to the temperature; thus, moisture lost by evaporation is manifest as a shrinkage in pounds of salable product and, at temperatures of 55–68° F., the shrinkage losses become serious commercially. To offset this factor, ripening is conducted in a humid atmosphere which is less conducive to evaporation of the moisture from the flesh. On the other hand, inasmuch as a moist or humid atmosphere of relatively high temperature constitutes a medium which is most favorable for the growth of spores, mold, and bacteria, the process involves irradiation of the meat with light rays having germicidal or bactericidal properties, and by bathing the meat during ripening in streams of air which, though humid, is also sterile. In this manner trimming losses are avoided.

When the aging process just described has been completed, the meat is chilled down to a final temperature of about 34–40° F. which requires another 20–24 hours of time, after which the meat is ready for shipment or retail sale. Meat produced by the process just described is of excellent quality and flavor and the process, in consequence, has commanded substantial usage in the packing industry despite the equipment, controls and inventory costs which it entails.

In both the conventional two to four week ripening process, and also in the more recent accelerated ripening process, the ripening step is a definite and separate phase of the whole operation which requires a definite and separate period of time additional to the time required for the killing, bleeding, dressing out and similar normal processing operations.

The present invention contemplates a packing process in which tenderization of the muscles and tough tissues in the flesh is caused to take place, without loss of flavor or food value, and without significant shrinkage, within a period of 24–30 hours total time, coincident with normal processing and chilling of the carcass. Thus, tender meat is produced within a matter of hours, as distinguished from the days or weeks of treatment that were the best available according to past practices. Since the time required for this treatment is so short, no noticeable unwanted surface or internal changes occur by way of bacterial action, rancidification of fats or the like. In particular, the method readily is employed as an adjunct to the normal slaughtering and dressing out procedure, without requiring extra refrigeration facilities, extra time, or expensive apparatus for conditioning and sterilizing large volumes of circulating air. The rapidity of processing provides a commensurate reduction in inventory expense.

This invention, briefly, is based upon the discovery and determination that such results may readily be secured by electric stimulation of the fresh meat promptly after bleeding in the course of slaughtering, to the extent that the irritability of the nerves and contractile tissues is fully or substantially exhausted. Otherwise expressed, electric irritation is employed to effect release of the latent energy stored within the muscles, nerves or tissues, whereby the meat is rendered more susceptible to ensymatic digestion or to chemical alteration capable of making the meat more tender. More specifically, the invention contemplates a procedure wherein the animals, after being killed and bled and preferably, but not necessarily, within approximately fifteen to thirty minutes thereafter, are contacted with electrodes to produce galvanic or faradic responses therein with attendant contraction of the muscles.

This treatment does not, per se, make the connective or muscle tissue any more tender, but conditions or prepares the meat so that tenderization will occur within a short period of time after slaughter. From this point of view, therefore, it is proper to characterize the invention as a process for conditioning meat to render it more susceptible to being tenderized by the natural enzymes within the meat.

The practice of the invention, in detail, and the results are disclosed in conjunction with the drawings in which:

Figure 2 is a chart showing the comparative time rate of decrease of pH in stimulated and unstimulated beef carcasses.

Figure 5 is a chart showing the relative time rate of increase of tenderness of beef treated conventionally, beef treated by the more recent accelerated aging process described herein, and by the process of the present invention.

Figure 1:
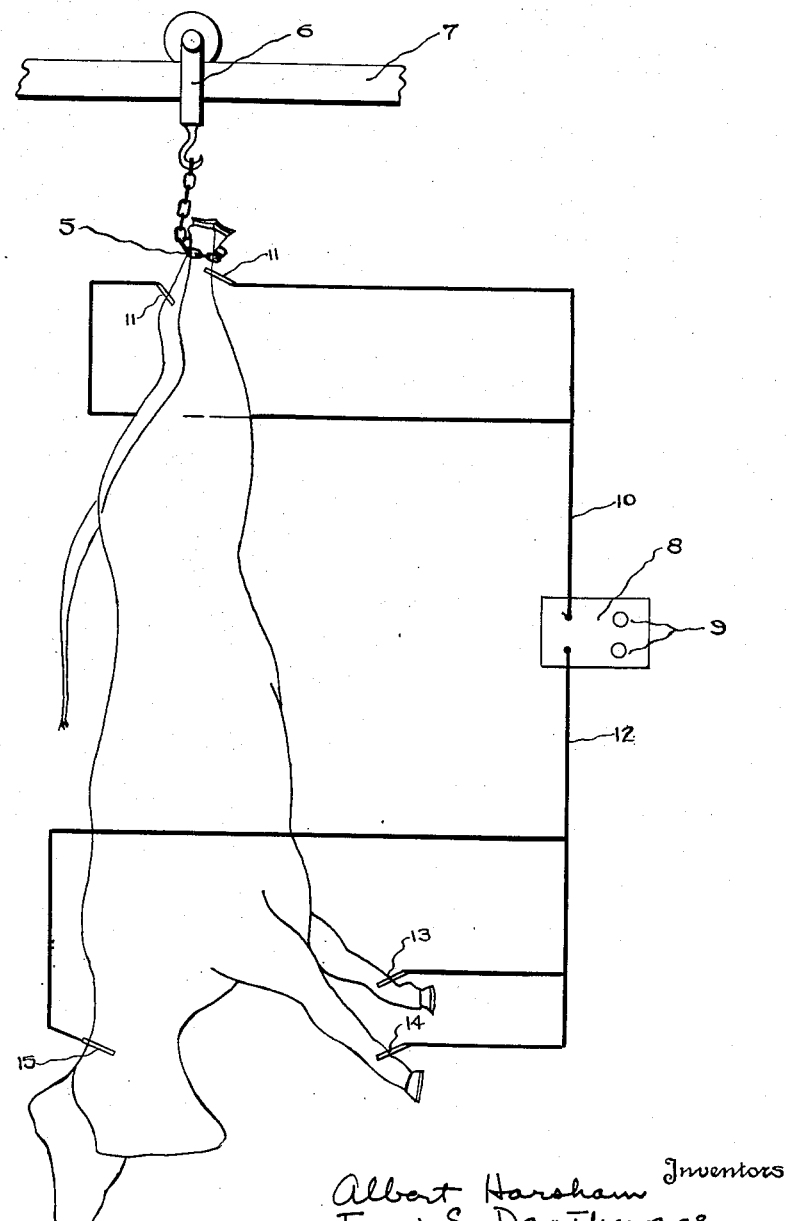
Figure 1 is a diagrammatic view of a beef carcass being stimulated.

In the practice of the invention, electric stimulation of the muscles and nerves is produced by introducing alternating current therein, or by applying direct current impulses periodically or aperiodically to the flesh. In either mode of treatment, it is the shocks which appear to produce the desired response and thereby induce the series of reactions which subsequently take place. This factor is of considerable practical advantage since desired shock effects may be produced with low overall power consumption and with little or no increase in flesh temperature.

The irritability of the muscles, and their responsiveness to electric stimulation, by which the desired result is obtained in this process, diminishes gradually after death and our work to date has indicated that the effectiveness of the treatment does also. We believe it is desirable, therefore, to perform electric stimulation of the beef carcass or the side of beef as soon as reasonably practicable after the animal has been knocked and bled. After substantially one to one and one-half hours, the muscles may have lost their irritability to such an extent that little benefit can be obtained by applying the treatment thereafter. The optimum time of treatment will, of course, vary from animal to animal, depending upon its history down to the time of death, and also depending to some degree upon the type of electrification which is employed, but, as a matter of choice, the process should be applied before the muscles and nerves have died, suffered substantial deterioration or loss of irritability.

Electric stimulation may be performed using electrical energy of various modalities; the precise voltage, amperage and frequency are not of critical importance. At very small currents, little or no muscle reaction is obtained and it is apparent therefore that the current should be above the rheobase of the tissue, that is, the level at which muscular response commences. Voltage must be sufficiently high to overcome the resistance of the tissues and permit an activating current to flow therein. For instance, low voltages, e. g., 40–50 volts, or even much lower, produce a stimulating effect, but higher potentials of from 100 to 3000 volts are preferred because of the better current distribution over the cross-section of the carcass and the correspondingly greater certainty which attends their use. Still higher potentials seem to be unnecessary and, in fact, introduce hazards to safety and problems in maintaining suitable insulation which are all the more difficult to combat because of the wet conditions prevailing in a packing house.

The frequency, or rate of impulse application also may vary over wide ranges; for instance, from 10 to 150 or more impulses or cycles per second. Impulses at a rate lower than 10 per second will produce entirely satisfactory results so far as irritation of the muscles is concerned, but rhythmic jerking or muscular response of the carcass may occur to an undesirable degree, and also, the time of treatment is somewhat prolonged. On the other hand, muscles have a definite time response to excitation and, if the frequency is too high, relatively little benefit may result. By way of example, suitable results have been obtained with the application of current with a condenser of one-third microfarad capacity charged to approximately 3000 volts through a rectifier and discharged through the carcass by means of a thyratron at the rate of twenty impulses per second or, by treating with the use of 60 cycles alternating current supplied from a 110 volt distribution circuit. These values are illustrative only, and it will be understood that satisfactory results may be obtained using a variety of other voltage and current conditions.

These periodic discharges may be produced in other ways as, for example, by charging a condenser through a rectifier from a transformer on one-half cycle, and discharging it through the carcass by means of a thyratron on the following half cycle. This provides simple means for charging the condenser and discharging a predetermined amount of electrical energy through the carcass, thereby preventing deleterious reactions such as heat.

Another method for accomplishing the same result is to alternately connect a condenser across a desired voltage and the carcass by a mechanical vibrator or a moving contactor, similar to a distributor.

Where high voltages and relatively low frequency of discharge is satisfactory, the condenser may be charged through a rectifier from a transformer. A spark gap, or its equivalent, in series with the carcass connected across the condenser, limits the discharges to voltages necessary to break down the gap. An induction coil, with a suitable interrupter, may be substituted for the rectifier-condenser-thyratron or spark gap arrangement. However, this is somewhat less flexible and tends to be more erratic in operation.

From an operative point of view, one suitable method of stimulating a whole carcass or a side thereof, as desired, is shown in Figure 1. The carcass, or side is shackled by the hind legs as at 5, and is suspended from a trolley 6, which is movable along a rail 7. Electric energy is supplied from a suitable source 8, which is supplied from an input circuit 9. One side 10 of the generator output circuit is connected to one or more electrodes 11 which may be sunk into the hind legs of the carcass below the shackle, that is, just above the hoofs, one electrode preferably being inserted into each leg for symmetry in the distribution of the current. The other side 12 of the generator output circuit is connected to electrodes 13, 14 and 15, electrodes 13 and 14, by preference, being sunk into the tissues of the fore legs just above the hoofs while electrode 15 is inserted into the neck just below the base of the skull. The arrangement is suitable for obtaining uniform distribution of current throughout the carcass whereby uniformity of stimulation of the muscles is obtained but the exact details may be varied to suit the convenience of the operator or to suit working conditions.

If the voltage is high, and the resistance of the flesh is also high, the danger of marring edible flesh at the points of introduction of the electrodes may be obviated by inserting them at the tendon areas of the legs, since these portions of the carcass are used for other purposes than eating. Also, since it is desirable to perform stimulation as soon as possible after death, this treatment is conducted preferably before skinning; thus, the electrodes, of rod-like nature, may be pushed through the hide into the flesh.

The muscular responses of the carcass will be exhausted within five to ten minutes approximately, varying only to a relatively small degree with the voltage, the current conditions, and the particular animal. Muscular response usually is manifest as a physical contraction; with the carcass hung by the hind legs, the front legs are drawn upwardly and an entire tenseness of the carcass becomes apparent.

The precise physiological circumstances which account for the susceptibility of meat to becoming tenderized after treatment in this manner cannot be explained fully from the evidence available at present. Fundamentally, it appears that electric stimulation of the muscle promptly after bleeding renders it more susceptible to the desired autolytic digestion, at a given temperature, than muscle degenerating naturally, at the same temperature, after death. Furthermore, the production, within the muscles, of a medium favorable to catabolic enzyme activity while the temperature of the carcass is at or slightly above the normal temperature hastens the action of the acids and enzyme systems on both the muscle fibers and the connective tissues.

Perhaps this susceptibility to attack by the enzymes can be explained by comparison with the physiological reactions of the muscle during life. Normally, latent energy is stored in live muscles in the form of a sugar, glycogen. When the muscles respond to stimuli, glycogen is converted finally into lactic acid; subsequently, during rest, the latent energy of the muscles is stored by the partial reconversion of lactic acid into glycogen through the medium of oxygen supplied from the blood stream.

After an animal has been killed and the blood has been removed, the muscles for a short period of time continue to live on, dying gradually as oxygen present in the residual blood and in the tissues is consumed. As this occurs, the pH value of the tissues drops slowly but progressively. This is believed to be due to the accumulation of the products of anaerobic tissue metabolism or catabolism which, in turn, may stimulate some of the muscle fibers to contract and produce greater amounts of acids and other catabolic products. These particular fibers then go from a state of contracture to rigor without relaxing. Normally, therefore, the microscopic appearance of muscle in rigor is that of a few contracted fibers in a larger number of uncontracted fibers.

It has been found that these contracted fibers disintegrate on aging much sooner than the uncontracted fibers and by this disintegration increase the tenderness of meat.

In the present process the muscle fibers are caused to contract uniformly so that the concentration of the products of anaerobic respiration rapidly reaches a high level. The muscle fibers, being uniformly substantially fatigued, usually go into contracture in approximately one to one and one-half hours.

The pH of the tissue of a live animal is substantially 7.3, and soon after slaughter reaches 7.0. In conventional slaughtering procedure this pH falls, within approximately 10 to 24 hours, to approximately pH 6.1. However, in the present treatment, it is found that the pH drops to 6.0–6.2 within one hour and may fall to as low as 5.60–5.90 in approximately twelve hours. Thus, soon after slaughtering the muscles and connective tissue are caused to reside in the environment of an acid medium which aids or favors the action of certain enzymes upon both the connective tissue and the muscles. Figure 2 shows the representative drop in pH of flesh which has been stimulated (curve A) in comparison to the relatively slow drop in pH of an unstimulated carcass (curve B).

Figure 3:
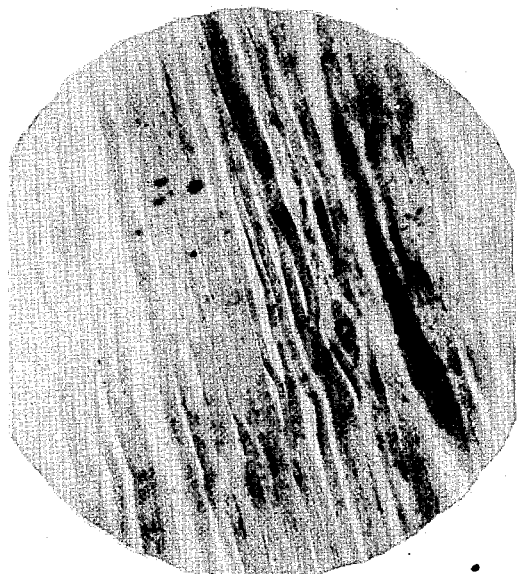
Figures 3 and 4 are photomicrographs of tissue from unstimulated and stimulated beef carcasses, respectively.
Figure 4:
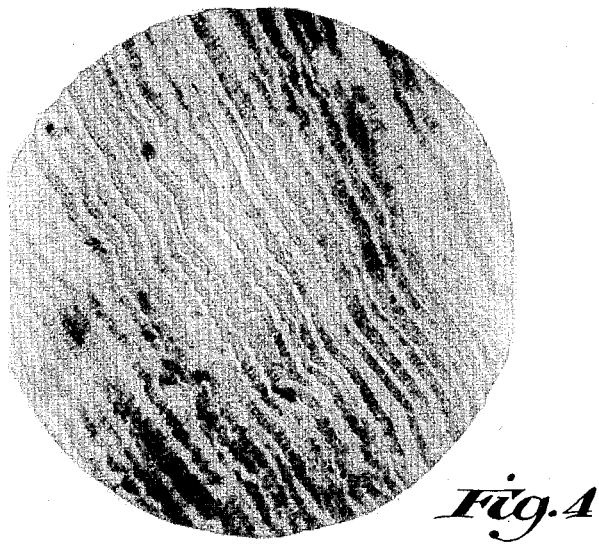

The relative effects of electric stimulation in causing uniform contraction of muscular fibers is shown comparatively in Figures 3 and 4. Figure 3 is a photomicrograph of a section of beef taken after the onset of normal rigor mortis. Figure 4 is a comparative section of beef which has been subjected to electric stimulation. In both figures, the muscular fibers are seen as the dark bands and the light areas depict spaces between the dark bands, such openings being caused by preparation of the meat for sectioning.

It will be seen in Figure 3 that the majority of the muscle fibers are wavy, passively folded, or of corrugated nature. This waviness of the majority of fibers is caused by the actual contraction of the relatively fewer fibers which appear substantially straight in the figure, and which have contracted naturally, for some reason or another, during the onset of rigor mortis. It is apparent that no substantial contraction of the majority of the muscle fibers has occurred.

In Figure 4, substantially all of the muscle fibers are straight, or of such linear nature that their contraction is apparent. Thus, these fibers, by electric stimulation during their period of irritability, have become fatigued to the extent that they can no longer relax, and in this condition have become set in rigor mortis, this state being hastened by the products formed within the muscle fibers when they are stimulated to contract anaerobically. Hence, these fibers have been forced to expend or release their latent energy and produce a more favorable environment for the action of catabolic enzymes.

In addition to these factors, it is recognized that animal flesh contains no one but many enzyme systems, including (a) the lipases, which demand high alkalinity and function at pH 7 to 10; (b) the trypsins and oxidases which are favored by lower alkalinity such as pH 7-9; (c) enzymes such as cathepsins favored by acidity or pH 4.7 to 6.3, and (d) such enzymes as the pepsins which demand high acidity or pH 1.5-2. These various enzymes appear to be specific in their preference for certain conditions, hence, it may be that electric stimulation accompanied by a relatively rapid change in the pH value at favorable temperatures, enables the various types of enzymes serially to exert digesting or softening action on the trough tissues in a short period of time. There is substantial evidence that the glands, which are recovered from the carcass for their value as a source of materials having medicinal and therapeutic properties, are not adversely affected by the treatment.

In normal slaughtering procedure, it has been conventional practice to kill the animal, bleed, and (in the case of beef) dehead the carcass, then dehair or skin and eviscerate it, split the carcass into halves, wash the flesh, place it in a shroud and chill. In the application of the present invention, the step of stimulation is introduced after bleeding and preferably before deheading or skinning. In this manner, the muscles are stimulated soon after death and before there has been a substantial loss in their irritability. After this operation, using beef as an example, decapitating, skinning, evisceration, splitting, washing, shrouding and chilling may be conducted in the usual manner. Variations in procedure are described at a later point in the specification.

The onset of rigor mortis begins promptly after electric stimulation of the carcass but does not progress so rapidly as to cause difficulty in the subsequent skinning and dressing operations. In view of the short period of time required for the respective processing operations, the fats do not solidify nor interfere with the diffusion of the enzymes through the favorable environment which electric stimulation has provided for them. It is particularly significant, from a commercial point of view, that the time expended in this treatment does not add appreciably to the total time required for processing the carcass from the killing to the shrouding or final chilling stages; that is, electric stimulation may proceed while the carcass is passing from one operation to the next, with no decrease in rate of production. Hence, an expenditure of 5 to 10 minutes time devoted to electric stimulation effects a saving of 44 hours or more, which otherwise would be required for tenderizing, depending upon which prior art process is chosen for comparison.

After stimulation, the carcasses or sides of beef, whether shrouded or not, are moved to the chilling room. This will occur in approximately one to three hours after killing. Thereafter within a period of approximately 16 to 24 hours during which the temperature of the flesh is being lowered to a degree suitable to permit shipment of the meat, the tenderization is essentially completed. It should be noted that the dynamics of enzymatic activity are such that the process of tenderization continues to proceed at a reduced rate until the meat is cooked. Thus, in general, the total time required for the practice of the present process, from the killing of the live animal to the production of tenderized meat therefrom in the retail cooler ready for shipment or distribution, may be as short as approximately 17 to 27 hours, though usually the exigencies of processing will be such that about 36 hours elapse in normal plant scheduling.

While the procedure just described is representative of the practice of the invention, variations are permissible in the stage at which electric stimulation is applied and in the procedure followed after washing or shrouding. For instance, if stimulation is deferred for 45 minutes to an hour after slaughtering, the loss of responsiveness to irritation of the less exhausted muscles may be offset by subjecting the meat to temperature conditions which favor a more rapid enzymatic action. In such cases, the carcasses or sides of beef, after washing, may be held for approximately 2 to 14 hours at 55–68° F., then introduced into the chill room at 34° F. for a period of approximately 16 to 24 hours.

In determining the degree of tenderization obtained by the use of the procedure described herein an organoleptic, panel testing method has been used. This procedure is described in "Food Research," volume 11, Number 6, 1946, pages 525 to 534. For tenderness grading, according to this method, a zero to ten scoring system is used, comprising a schedule of 10, very tender; 8, tender; 6, slightly tough; 4, tough; and 2, very tough. Paired samples, taken from respective sides of a carcass, cooked under standardized conditions and differing only in respect to the tenderization process to which the sides were subjected, are submitted to panel members who assign values according to the scoring system. While the subjective human element is not eliminated in this testing method, still, the results are more reproducible than by the use of various mechanical testers heretofore proposed.

This method of testing has enabled the timewise development of tenderness to be charted, for comparison of the efficacy of respective treatment methods. Such results are illustrated in the chart, Figure 5.

The progress of tenderization of meat, aged according to the conventional 2 to 4 week aging process is shown by the dot and dash line. Tenderness increases gradually and somewhat uniformly for a period of approximately seventeen days of storage, after which a level or plateau of tenderness is reached. For substantially nine days thereafter the tenderness value does not change appreciably. However, after approximately twenty-six days from the beginning of the aging process, tenderness again commences to increase. Various reasons have been offered to explain this behavior; apparently the nine days plateau period represents an interval of time following the exhaustion of the activity of one enzyme system and the beginning of activity of another enzyme system upon the more resistant muscles and connective tissue.

The effect of autolytic deterioration of the tougher tissue under the more recent accelerated process as described in the James Patent No. 2,169,081, is indicated by the dotted line. After five to six days of processing, which includes the time of storage in sterile humid atmosphere at a temperature of 55–68° F., the meat has become tenderized approximately to the same plateau level which was reached by meat aged conventionally for 17 days.

The development of tenderization of meat treated by the present process is shown by the solid line. By virtue of the concomitance of tenderization with the other processing operations, such as deheading, evisceration, etc., the meat has acquired a tenderness value of approximately 7 by the time it has reached the sales cooler, that is, within about 17 to 36 hours after the animal was killed. From this point on, increases in tenderness tend to follow the curve of tenderness of meat aged for prolonged periods.

The following examples illustrate detailed practice of the invention in various ways on a commercial scale.

*Example 1*

The animal is killed and bled, then the carcass with the head still attached, in approximately 10 minutes after killing, is electrically stimulated for approximately 10 minutes using 1500 volts at 20 to 60 impulses per second. After stimulation in this manner, the carcass is decapitated, skinned, eviscerated, split, washed, and shrouded. These operations will require approximately 45 minutes. The temperature of the carcass at this point will be approximately 103–105° F. The sides of beef are then placed in a chill box having an average temperature of approximately 33–36° F. and chilled to approximately 40° F. for sale.

*Example 2*

The animals are killed, bled, skinned, eviscerated and split into sides. The sides, either before or immediately after washing, are then subjected to electrical stimulation until the muscles are essentially fatigued. The internal temperature of the rounds at this point is usually 101–104° F. The sides are then held within a temperature of approximately 68° F. for a period of substantially 14 hours at the end of which time the internal temperature of the rounds is approximately 80° F. The sides are then chilled to a suitable temperature (substantially 40° F.) for distribution and sale.

*Example 3*

The animals are killed, bled, and stimulated electrically until visible reaction has essentially ceased. The temperature of the carcass at this point is usually 104–105° F. Following the usual procedure of skinning, eviscerating, splitting, and washing, the sides are placed in a cooler having a temperature of 33–36° F. and chilled to an internal temperature of 54–59° F. This usually requires 20–24 hours. The sides are then maintained at a temperature of substantially 68° F. for a period of 24–48 hours while simultaneously inhibiting the development of surface growths of molds and bacteria by irradiating the meat with ultra-violet light substantially restricted to a range of between 2500 and 3000 A. U. At the end of 24 hours, the internal temperature of the round is about 64° F.; at the end of 48 hours, about 68° F. Following this period of holding at substantially 68° F., the meat is chilled to a suitable temperature for distribution and sale.

From the investigations which have been completed up to the present time, the evidence points clearly to the fact that it is the release of energy from the muscular tissue rather than the electrical facilities by which the energy is released, which accounts for the beneficial results. For instance, carcasses were treated uniformly promptly after slaughtering by electric stimulation under the following conditions and times:

3000 volts—⅓ microfarad—20 cycles for 10 minutes 3000 volts—⅓ microfarad—20 cycles for 3 minutes 1750 volts—1 microfarad—60 cycles for 10 minutes The term "cycle" as used above, and the term "impulse," as used in earlier portions of the specification are intended to designate one change in magnitude from minimum or zero to maximum, either positive or negative.

In each instance, the carcasses were subjected to the same processing and chilling steps and in each instance the same level of tenderness was obtained. It will be noted that these conditions were selected to provide release of the same amount of energy into the carcass on each impulse according to the formula $$E = \frac{CV^2}{2}$$

in which E is electrical energy; C is capacity in farads, and V is potential in volts. However, the total work done on the carcass in treatment at 1750 volts as described above is three times that of the treatment at 3000 volts, ⅓ microfarad, 20 cycles for 10 minutes and ten times that of the treatment at 3000 volts, ⅓ microfarad, 20 cycles for 3 minutes.

During treatment, the temperature within the tissue may increase very slightly, for example, 1–2° F. through the chemical change which attends release of latent energy from the muscular tissue. Electric stimulation, as described herein, does not, by electrical resistance of the carcass, cause an appreciable change in temperature through resistance heating.

Meat from younger animals will, of course, be more tender to begin with, than the meat from older cattle or animals. As a general rule, however, treatment in accordance with the present invention affects tenderization to a more or less uniform level of approximately 7. to 7.5, regardless of the animal's age, or history. Peculiarly, in other words, it appears that the process exhibits greater effect on tough tissue. This may be explained in part by the fact that tenderization of the muscles and connective tissue through enzymatic digestion may proceed up to a certain point after which further reductions diminish according to the plateau shown in Figure 5.

While the invention confers substantial benefits upon beef, it is adapted to be used in the processing of the flesh of other animals, for example, lamb, mutton, venison, cattalo, and the like. Pork does not respond unfavorably to the treatment, but its treatment usually is not required since pork is usually tender due to the nature of the animal.

Having described our invention, we claim:

1. The process of conditioning meat to render it more susceptible to tenderization, which process comprises electrically stimulating the muscular tissue of the meat promptly after slaughtering of the animal and before the muscles have suffered substantial natural deterioration, to the extent that the irritability of the nerves and contractile tissues is substantially exhausted and thereby effecting release of a substantial portion of the latent energy of the muscular tissue.

2. In the art of packing meat, the step of subjecting muscular tissue of an animal carcass, promptly after slaughtering and bleeding but before substantial natural deterioration has occurred, to electrical stimulation by introducing a succession of electrical impulses into the meat to the extent that the irritability of the muscular tissue thereof is at least substantially exhausted.

3. The art of packing tender meat which comprises electrically stimulating the muscular tissue of an animal, promptly after slaughtering thereof, by introducing a succession of electrical impulses into the muscular tissue to substantially decrease its latent energy after killing, and then chilling the meat to discourage bacterial invasion, said meat being allowed to ripen coincidentally with treatment.

4. The process of producing tenderized beef, which comprises the steps of killing the animal, bleeding the carcass, then promptly electrically irritating the muscular tissue to the extent that the irritability of the muscular tissue is substantially exhausted and the latent energy thereof is released, and subsequently chilling the meat.

5. In the art of packing meat, the step of rapidly inducing rigor mortis of the carcass by electrically irritating muscular tissue in the carcass immediately after killing, to the extent that the irritability of the muscular tissue is at least substantially exhausted, and thereby establishing an acid environment for the muscles and connective tissue which favors enzymatic tenderization of the muscles and connective tissues.

6. In the art of packing, the process of conditioning meat to render it more susceptible to tenderization by enzymatic action comprising electrically irritating muscular tissue of the animal carcass promptly after killing and within the period of approximately one hour, before the muscular tissue has lost its irritability by natural deterioration and continuing such electric irritation until the irritability of the muscular tissue is substantially exhausted.

7. In the art of packing meat, the method which comprises slaughtering an animal and then promptly thereafter establishing within the meat, an acid environment which favors and accelerates the enzymatic degradation of both the muscular and connective tissues by subjecting the meat to a succession of electrical impulses until the irritability of the tissues is substantially exhausted.

8. In the art of packing meat, the method which comprises slaughtering an animal, and promptly thereafter converting glycogen in the muscular tissue into lactic acid to the extent of establishing a pH of 6.0-6.2 by subjecting the muscular tissue to a succession of electrical impulses while the muscles are in irritable condition and for a period of time sufficient to substantially exhaust the latent energy of the muscular tissue.

9. In the art of packing meat, the process which comprises slaughtering an animal, and promptly thereafter converting glycogen in the muscular tissue into lactic acid to the extent of establishing a pH of 6.0-6.2 at substantially normal body temperature of the animal by subjecting the muscular tissue to a succession of electrical impulses sufficient to substantially exhaust the irritability thereof.

10. The method of effecting tenderization of meat which comprises the steps of subjecting the warm meat immediately after slaughter to exciting electrical impulses until muscular excitation has substantially ceased, and then, without preliminary chilling, maintaining the meat under temperature conditions effective for autolytic softening of tissues thereof until a desired state of tenderness is attained by action of the natural enzymes therein.

11. The method of effecting tenderization of meat which comprises subjecting the meat immediately after slaughter to a succession of exciting electrical impulses until muscular excitation has essentially ceased, and then maintaining the meat within the temperature range which at maximum is substantially the body temperature of the living animal and at minimum is the hardening point of liquid fats in the meat, for a time sufficient to produce disintegration of muscle cell walls in the meat.

12. The method of effecting tenderization of meat which comprises subjecting bared surfaces of the suspended meat immediately after slaughter to a succession of exciting electrical impulses imposed between the point of suspension and other points adjacent thereto, successively selecting the said other points at greater distances from the point of suspension as the muscular responses to excitation decrease until all muscular excitation has essentially ceased, and then maintaining the meat within the temperature range of substantially 40° F. and the body temperature of the living animal until a desired condition of tenderness is attained by action of the natural enzymes therein.

13. The method of effecting tenderization of meat which comprises subjecting the meat immediately after slaughter to a succession of exciting electrical impulses along the lengths of muscle tissues until muscular excitation has essentially ceased, and then maintaining the meat within the temperature range of substantially 40° F. and the body temperature of the living animal until a desired state of tenderness is attained by action of the natural enzymes therein.

14. The method of effecting tenderization of meat which comprises subjecting the meat immediately after slaughter to a succession of exciting electrical impulses until muscular excitation has essentially ceased, and then maintaining the meat within a temperature range which at the lowest is essentially that at which liquid fats will harden and at the highest is not greatly in excess of the natural body temperature of the living animal, until a desired state of tenderness is attained by action of the natural enzymes therein.

15. The method of effecting tenderization of meat which comprises subjecting the meat immediately after slaughter to a succession of exciting electrical impulses until muscular excitation has essentially ceased, and then maintaining the meat within the temperature range of substantially 40° F. and the body temperature of the living animal until a desired state of tenderness is attained by action of the natural enzymes therein.

16. The method of effecting tenderization of meat which comprises subjecting bared surfaces of the suspended meat to the effects of electrical stimulation by an alternating current of a frequency of substantially 60 cycles per second, by passing the current through limited lengths of the meat at successively increased voltages up to substantially 130 volts and thereby effecting essential cessation of muscular response in the meat, whereby to provoke a rapid drop of pH value to not over 6.2 within three hours after slaughter, and then maintaining the meat within the temperature range which at maximum is substantially the body temperature of the living animal and at minimum is the hardening point of liquid fats in the meat, for a time sufficient to produce disintegration of muscle cell walls in the meat.

17. A method of conditioning meat to render it more susceptible to autolytic tenderization, which method comprises electrically irritating meat promptly after the animal has been slaughtered and while the muscular tissue of the meat is in irritable condition until the irritability of the nerves and contractile tissues is at least substantially exhausted and, subsequently, chilling the meat.

ALBERT HARSHAM.
FRED E. DEATHERAGE.

REFERENCES CITED

The following references are of record in the file of this patent:

UNITED STATES PATENTS

| Number | Name | Date |
|---|---|---|
| 337,334 | Jones et al. | Mar. 2, 1886 |
| 2,169,081 | James | Aug. 8, 1939 |

OTHER REFERENCES

"The Tenderization of Meat," by the Industrial Fellowship on Meat Merchandizing, Mellon Institute, Pittsburgh, Pa., 1940, pages 1 to 6.

"The Structure and Composition of Foods," 1937, by A. L. Winton, vol. III, published by John Wiley & Sons, Inc., New York, page 328.